United States Patent [19]

Sugiyama

[11] Patent Number: 4,608,600
[45] Date of Patent: Aug. 26, 1986

[54] DIGITAL VIDEO SIGNAL TRANSMITTING APPARATUS

[75] Inventor: Hiroyuki Sugiyama, Isehara, Japan

[73] Assignee: Victor Company of Japan, Ltd., Kanagawa, Japan

[21] Appl. No.: 600,497

[22] Filed: Apr. 16, 1984

[30] Foreign Application Priority Data

Apr. 22, 1983 [JP] Japan .................................. 58-71144

[51] Int. Cl.$^4$ ............................................. H04N 7/12
[52] U.S. Cl. .................................. 358/138; 358/133; 360/9.1
[58] Field of Search ................. 360/9.1; 358/133, 135, 358/136, 138, 141

[56] References Cited

U.S. PATENT DOCUMENTS

| | | | |
|---|---|---|---|
| 3,372,228 | 3/1968 | Law | 358/138 X |
| 3,564,127 | 3/1968 | Sziklai et al. | 360/9.1 |
| 4,148,070 | 1/1977 | Taylor | 358/160 |
| 4,286,291 | 8/1981 | Taylor et al. | 358/138 |
| 4,292,652 | 5/1978 | Yumde et al. | 358/138 |
| 4,468,708 | 8/1984 | Coleman, Jr. | 358/133 X |

FOREIGN PATENT DOCUMENTS

| | | |
|---|---|---|
| 1236749 | 7/1971 | United Kingdom . |
| 1250226 | 10/1971 | United Kingdom . |
| 1328657 | 8/1973 | United Kingdom . |
| 1413637 | 11/1975 | United Kingdom . |
| 1438856 | 6/1976 | United Kingdom . |

OTHER PUBLICATIONS

The MOS Memory Data Book for Design Engineers, 1980 Texas Instruments Inc., Preliminary Data Sheet for TMS 4108 NL, p. 25.

*Primary Examiner*—James J. Groody
*Assistant Examiner*—Victor R. Kostak
*Attorney, Agent, or Firm*—Ladas & Parry

[57] ABSTRACT

A digital video signal transmitting apparatus comprises a picture element data forming circuit for obtaining picture element data by subjecting an analog video signal to a digital pulse modulation, a transmitting picture element data producing circuit for successively producing for every one field, picture element data which are located at different picture element positions in a picture for each duration of one field and amount to ¼ the number of picture element data corresponding to one field, among the picture element data which are successively obtained from the picture element data forming circuit in each duration of one field among first, second, third, and fourth durations of one field, and a transmitting circuit for transmitting through a transmission path a digital video signal in which the transmitting picture element data from the transmitting picture element data producing circuit are time-sequentially multiplexed.

6 Claims, 32 Drawing Figures

FIG. 2A

| | I-1 | II-1 | I-2 | II-2 | I-3 | II-3 |
|---|---|---|---|---|---|---|
| | | | | 13 | 29 | 45 |
| | | 9 | | 25 | | 41 |
| | 5 | | 21 | | 37 | |
| | 1 | 17 | | 33 | | |

FIG. 2B

| | I-1 | II-1 | I-2 | II-2 | I-3 | II-3 |
|---|---|---|---|---|---|---|
| | | | | 62 | 78 | 94 |
| | | 58 | | 74 | | 90 |
| | 54 | | 70 | | 86 | |
| | 50 | 66 | | 82 | | |

FIG. 2C

| | I-1 | II-1 | I-2 | II-2 | I-3 | II-3 |
|---|---|---|---|---|---|---|
| | 15 | | 31 | | 48 | |
| | 11 | | 27 | | 43 | |
| | 7 | | 23 | | 39 | |
| | 3 | | 19 | | 35 | |

FIG. 2D

| | I-1 | II-1 | I-2 | II-2 | I-3 | II-3 |
|---|---|---|---|---|---|---|
| | | 64 | | 80 | | 96 |
| | | 60 | | 76 | | 92 |
| | | 56 | | 72 | | 88 |
| | | 52 | | 68 | | 84 |

FIG. 8A

|  | Y0 |  |  |
|---|---|---|---|
| 411 | 412 | 413 | 414 |
| WA | WA | WA |  |
| WB | WB |  |  |
| WC |  |  |  |

FIG. 8B

|  | Y1 |  |  |
|---|---|---|---|
| 411 | 412 | 413 | 414 |
|  | WA | WA | WA |
|  | WB | WB |  |
|  | WC |  |  |

FIG. 8C

|  |  | Y2 |  |
|---|---|---|---|
| 411 | 412 | 413 | 414 |
| Wa |  | WA | WA |
|  |  | WB | WB |
|  |  | WC |  |

FIG. 8D

|  |  |  | Y3 |
|---|---|---|---|
| 411 | 412 | 413 | 414 |
| Wa | Wa |  | WA |
| Wb |  |  | WB |
|  |  |  | WC |

FIG. 9A

| 1 | 50 | 3 | 52 | 5 | 54 | 7 | 56 | 9 | 58 | 11 | 60 | 13 | 62 | 15 | 64 |
|---|----|---|----|---|----|---|----|---|----|----|----|----|----|----|----|
| | | | | | | | | | | | | | | | |
| 17 | 66 | 19 | 68 | 23 | 70 | 25 | 72 | 27 | 74 | 29 | 76 | 31 | 78 | 33 | 80 |
| | | | | | | | | | | | | | | | |
| 33 | 82 | 35 | 84 | 39 | 86 | 41 | 88 | 43 | 90 | 45 | 92 | 47 | 94 | 49 | 96 |
| | | | | | | | | | | | | | | | |

FIG. 9B

| | | | | | | | | | | | | | | | |
|---|----|---|----|---|----|---|----|---|----|----|----|----|----|----|----|
| 17 | 50 | 19 | 52 | 23 | 54 | 25 | 56 | 27 | 58 | 29 | 60 | 31 | 62 | 33 | 64 |
| | | | | | | | | | | | | | | | |
| 33 | 66 | 35 | 68 | 37 | 70 | 39 | 72 | 41 | 74 | 43 | 76 | 45 | 78 | 47 | 80 |
| | | | | | | | | | | | | | | | |
| 33 | 82 | 35 | 84 | 37 | 86 | 39 | 88 | 41 | 90 | 43 | 92 | 45 | 94 | 47 | 96 |

FIG.14A

| | I-1 | II-1 | I-2 | II-2 | I-3 | II-3 |
|---|---|---|---|---|---|---|
| | 1 | | | | | |
| | | 19 | | | 33 | |
| | 5 | | | | 37 | |
| | | 23 | | | 41 | |
| | 9 | | 27 | | 45 | |
| | | | 31 | | | |
| | 13 | | | | | |

FIG.14B

| | I-1 | II-1 | I-2 | II-2 | I-3 | II-3 |
|---|---|---|---|---|---|---|
| | 50 | | | | 82 | |
| | | 68 | | | | |
| | 54 | | | | 86 | |
| | | | 72 | | 90 | |
| | 58 | | 76 | | | |
| | | 62 | | | 94 | |
| | | | 80 | | | |

FIG.14C

| | I-1 | II-1 | I-2 | II-2 | I-3 | II-3 |
|---|---|---|---|---|---|---|
| | | 17 | | | | |
| | 3 | | | | 35 | |
| | | 21 | | | 39 | |
| | 7 | | 25 | | 43 | |
| | 11 | | 29 | | | |
| | 15 | | | | 48 | |

FIG.14D

| | I-1 | II-1 | I-2 | II-2 | I-3 | II-3 |
|---|---|---|---|---|---|---|
| | | 66 | | | 84 | |
| | 52 | | | | | |
| | | 70 | | | 88 | |
| | 56 | | 74 | | 92 | |
| | 60 | | 78 | | 96 | |
| | | 64 | | | | |

DIGITAL VIDEO SIGNAL TRANSMITTING APPARATUS

BACKGROUND OF THE INVENTION

The present invention generally relates to digital video signal transmitting apparatuses, and more particularly to a transmitting apparatus which transmits a digital video signal made up of picture element data corresponding to one field, by dividing the digital video signal into a plurality of picture element groups each corresponding to less than one field, to store the data of the digital video signal into a memory, and obtains a reproduced video signal by reading the same stored data from the memory a plurality of times.

When the signal-to-noise level at the time of the reproduction is over a predetermined value, a digital signal can be restored back to the original digital signal. Hence, in order to carry out recording and reproduction of a high quality, a digital video signal is recorded on and reproduced from a recording medium such as a magnetic tape and a disc. The digital video signal is obtained by subjecting an analog video signal to a digital pulse modulation such as a pulse code modulation, for example. In this case, when transmitting a digital video signal related to a still picture or related to a so-called partially moving picture in which only a part of the picture contains a movement, it is desirable to transmit as much video information as possible under the limitation of the recording capacity of the recording medium. Thus, a digital video signal corresponding to one field which is less than one frame which is originally to be reproduced was transmitted, or a so-called differential transmitting method was employed in the case of the partially moving picture, for example. According to the differential transmitting method, the frame correlation of the video information was noted, and a differential data between the picture element data of one frame and the picture element data of a subsequent frame was transmitted when the subsequent frame included picture element data different from the picture element data in the one frame.

When transmitting the digital video signal corresponding to one field, only the data related to the picture elements in one of first and second fields (odd and even fields) were transmitted among the picture elements which are arranged in a matrix form to make up one picture. For this reason, the vertical resolution of the reproduced picture obtained in this case, inevitably became poorer than the vertical resolution of the reproduced picture obtained when all of the picture element data corresponding to one frame was transmitted. Further, the folding noise increased, and when the picture contained an oblique line, for example, the oblique line was reproduced as a stepped line. Moreover, when the picture contained horizontal lines which differed in their thicknesses and positions, these differences were over-emphasized in the reproduced picture.

In addition, in a case where the differential transmitting method was employed and a large portion of the picture changed to a different picture, the different picture could not be displayed in the large portion of the picture until all of the digital video signals (picture element data) related to the different picture were stored into the memory within the reproducing apparatus. As a result, it took a long time to change the display in the large portion of the picture to the different picture.

SUMMARY OF THE INVENTION

Accordingly, it is a general object of the present invention to provide a novel and useful digital video signal transmitting apparatus in which the problems described heretofore have been eliminated.

Another and more specific object of the present invention is to provide a digital video signal transmitting apparatus in which, when writing a picture element data of an input digital video signal into a memory, the picture element data is compared with a picture element data which is related to the same picture element position but was obtained previously, and one or a plurality of previously written picture element data are replaced by the input picture element data or one or a plurality of data obtained by interpolating the input picture element data, according to a value which is obtained as a result of the comparison. A reproduced analog video signal is formed from the picture element data which are read out from the memory. According to the apparatus of the present invention, it is possible to obtain a reproduced picture within a short time which is in the range of a duration of one field, and the deterioration of the picture can be kept to a minimum by use of the frame correlation, compared to a case where a digital video signal corresponding to one field is transmitted and to a case where the differential transmitting method is employed when the displayed picture is to be changed. In addition, when transmitting a partially moving picture, a number of picture element data corresponding to the speed of the movement in the picture can be replaced. Hence, it is possible to display a picture which contains a quick movement, and further, it is possible to obtain an essentially perfectly still picture when displaying a still picture.

Still another object of the present invention is to provide a digital video signal transmitting apparatus which transmits a video signal having a wide band in a single channel of transmission path having a narrow band. According to the apparatus of the present invention, it is possible to reduce the sampling frequency to ¼ compared to the sampling frequency in the conventional apparatus, by dividing all of the picture element data of a video signal amounting to one field into four groups and successively transmitting each of the divided picture element data groups for every field. As a result, the band of the digital video signal which is transmitted, can be compressed.

A further object of the present invention is to provide a digital video signal transmitting apparatus which produces a reproduced analog video signal so that, between reproducing durations of first and second fields (odd and even fields), the picture element data of the first and second fields are alternately arranged and displayed in one scanning line, and the combination of the picture element data of the first and second fields displayed in the one scanning line is different between the reproducing durations of the first and second fields. According to the apparatus of the present invention, it is possible to visually reduce the noise due to the folding distortion, and it is also possible to reduce the apparent vertical resolution of the reproduced picture.

Other objects and further features of the present invention will be apparent from the following detailed description when read in conjunction with the accompanying drawings.

BRIEF DESCRIPTION OF THE DRAWINGS

FIGS. 2A, 2B, 2C, and 2D show embodiments of positions of picture element data of a digital video signal within a picture, which digital video signal is to be transmitted by the digital video signal transmitting apparatus according to the present invention;

FIGS. 8A, 8B, 8C, and 8D diagrammatically show the relationships between memory element groups in the block system shown in FIG. 5 and write-in control pulses;

FIGS. 9A and 9B show positions of picture element data in the picture in reproducing durations of first and second fields;

FIGS. 14A, 14B, 14C, and 14D show other embodiments of positions of picture element data of a digital video signal within a picture, which digital video signal is to be transmitted by the digital video signal transmitting apparatus according to the present invention.

DETAILED DESCRIPTION

Figure 1:
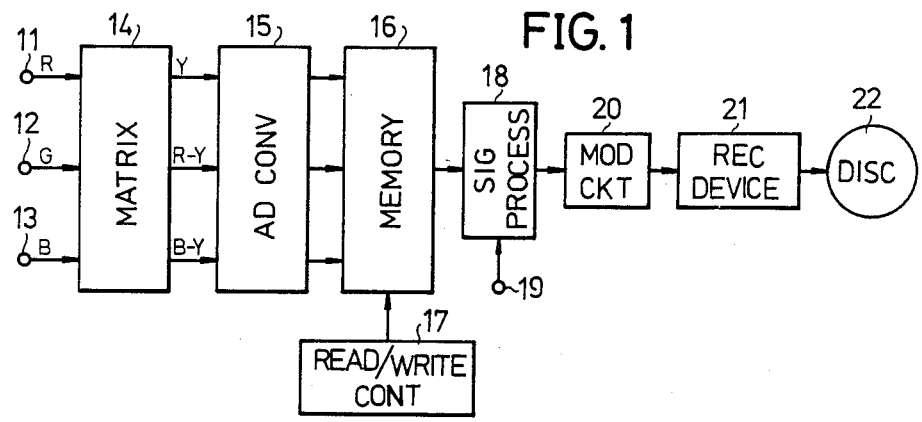
FIG. 1 is a systematic block diagram showing an embodiment of a recording system for a digital video signal which is to be transmitted by a digital video signal transmitting apparatus according to the present invention.

In FIG. 1, primary color signals R, G, and B of red, green, and blue which are obtained by picking up an image by a color television camera of a system which employs 625 scanning lines, for example, are applied to respective input terminals 11, 12, and 13. These primary color signals R, G, and B are supplied to a matrix circuit 14 which forms a luminance signal Y, and color difference signals (R−Y) and (B−Y) from these primary color signals R, G, and B. The luminance signal Y and the color difference signals (R−Y) and (B−Y) are respectively supplied to an analog-to-digital (AD) converter 15. The AD converter 15 samples and then quantizes the analog signals from the matrix circuit 14, and forms a digital signal (picture element data) having a quantization number of 8 bits for one picture element (sampling point), for example. The picture element data from the AD converter 15, are supplied to a memory 16. The digital luminance signal and the two kinds of digital color difference signals are respectively written into the memory 16 in response to a write-in pulse from a read/write controller 17. Among picture element data which make up one picture and are obtained by subjecting the analog video signal to a digital pulse modulation, picture element data which are arranged in a checkered pattern in the picture and correspond to one field, are serially read out from the memory 16 under the control of the read/write controller 17.

Description will now be given with respect to the read-out operation of the memory 16 in the digital video signal transmitting apparatus according to the present invention. For convenience' sake, it will be assumed that 16 luminance picture element data are arranged in the horizontal direction and 6 luminance picture element data are arranged in the vertical direction in one picture (one frame), for example. In this case, as shown in FIG. 2A, picture element data which are arranged at positions [1], [5], [9], and [13] in a first scanning line I-1 of the first field (odd field), picture element data which are arranged at positions [17], [21], [25], and [29] in a second scanning line I-2 of the first field, and picture element data which are arranged at the positions [33], [37], [41], and [45] in a third scanning line I-3 of the first field, are successively read out from the memory 16 in a duration of one field. Thereafter, predetermined picture element data which are arranged in the first, second, and third scanning lines II-1, II-2, and II-3 of the second field (even field), are successively read out from the memory 16 in a duration of one field. As shown in FIG. 2C, predetermined picture element data which are arranged in first, second, and third scanning lines I-1, I-2, and I-3 of the first field, are then successively read out from the memory 16 in a duration of one field. Further, as shown in FIG. 2D, predetermined picture element data which are arranged in the first, second, and third scanning lines II-1, II-2, and II-3 of the second field, are finally and successively read out from the memory 16 in a duration of one field. As shown in FIGS. 2A through 2D, the predetermined picture element data which are arranged in one scanning line and are read out from the memory 16, are mutually separated by three picture element data positions in the horizontal direction of the picture. As a result, among all of the luminance picture element data which make up one picture, the luminance picture element data which correspond to one field and are arranged in a checkered pattern at positions indicated by hatchings in FIG. 3, are read out from the memory 16 in a duration of four fields.

FIG. 2A shows the picture element data in the first, fifth, ninth, and thirteenth columns from the left of the picture, among the picture element data corresponding to the first field. FIG. 2C shows the picture element data in the third, seventh, eleventh, and fifteenth columns from the left of the picture, among the picture element data corresponding to the first field. FIG. 2B shows the picture element data in the second, sixth, tenth, and fourteenth columns from the left of the picture, among the picture element data corresponding to the second field. Further, FIG. 2D shows the picture element data in the fourth, eighth, twelfth, and sixteenth columns from the left of the picture, among the picture element data corresponding to the second field.

Figure 3:
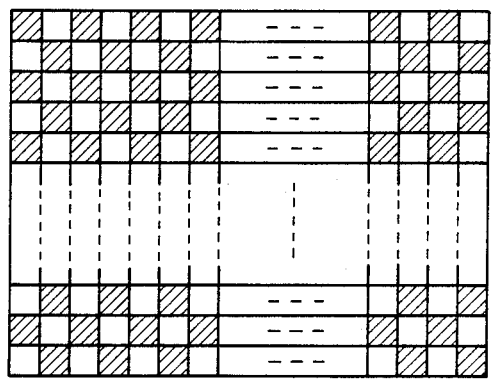
FIG. 3 shows an embodiment of positions of picture element data of a digital video signal within a picture, which digital video signal is to be transmitted by the digital video signal transmitting apparatus according to the present invention.

Among all of the picture element data corresponding to one frame, the memory 16 divides the picture element data indicated by the hatchings in FIG. 3 which amounts to one field, into four groups as shown in FIGS. 2A through 2D. Each of the divided picture element data groups are successively read out from the memory 16 for every one field period. In other words, the picture element data amounting to one field are decimated (or cut) to ¼ when read out from the memory 16 for one field period. Accordingly, the sampling frequency of the digital video signal in which the picture element data read out from the memory 16 are time-sequentially multiplexed, becomes ¼ the sampling frequency $f_s$ in the AD converter 15, and the upper limit frequency of the transmission band of the digital video signal becomes equal to $f_s/8$. Hence, the digital video signal from the memory 16 is transmitted in an extremely narrow band compared to the transmission band of the conventional apparatus.

On the other hand, picture element data of the two kinds of color difference signals (R−Y) and (B−Y) which are arranged at the positions indicated by the hatchings in FIG. 3, are also read out from the memory 16. For example, a digital video signal read out from the memory 16 has a signal format in which data are transmitted time-sequentially in terms of units, where one unit is made up of four luminance picture element data and one picture element data of each of the two kinds of color difference signals (R−Y) and (B−Y). The digital video signal read out from the memory 16, is supplied to a signal processing circuit 18 wherein the digital video signal is time-sequentially multiplexed with a digital audio signal or a control signal for random access from an input terminal 19. An output digital signal of the signal processing circuit 18, is supplied to a modulating circuit 20. The modulating circuit 20 modulates the incoming digital signal based on a predetermined modulating system, such as a frequency modulation system, which is suited for recording and reproduction. A modulated signal from the modulating circuit 20, is supplied to a recording device 21.

For example, the recording device 21 obtains a modulated laser beam by modulating a laser beam by the modulated signal from the modulating circuit 20, and a photosensitive agent on an original recording disc is intermittently exposed to the modulated laser beam. The original recording disc is then subjected to known developing and disc manufacturing processes, and the recording device 21 produces a disc 22. The digital video signal and the like are recorded on a spiral track on the disc 22.

Figure 4:
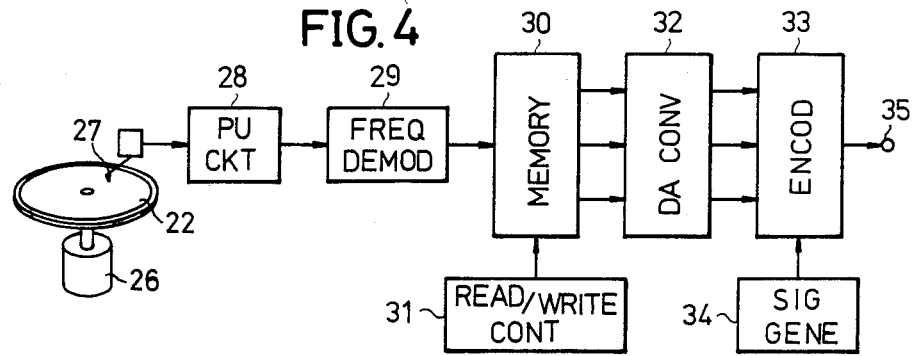
FIG. 4 is a systematic block diagram showing an embodiment of a digital video signal transmitting apparatus according to the present invention.

The present invention relates to an apparatus for transmitting the digital video signal from the disc 22 and the like, that is, for reproducing the digital video signal from the disc 22 and the like, for example. In FIG. 4, the disc 22 is recorded with a digital video signal which has been frequency modulated, for example. Among picture element data corresponding to one frame of an arbitrary picture, picture element data which correspond to one field and in which picture element data of the first and second fields coexist in a duration of four fields due to the processing in the recording system shown in FIG. 1, are time-sequentially multiplexed in the digital video signal recorded on the disc 22. In other words, the video signal corresponding to one field, is transmitted with ¼ the original number of picture element data. In order to reduce the memory capacity which is required to store the digital video signal, the digital video signal does not include signals such as a horizontal synchronizing signal, a vertical synchronizing signal, and a color burst signal.

The disc 22 is rotated by a motor 26, and the recorded signal is reproduced from the disc 22 by a pickup device 27. The pickup device 27 may be of a type which picks up and reproduces the recorded signal from the disc 22 according to the variation in the electrostatic capacitance between the disc 22 and a reproducing element of the pickup device 27, or of a type which picks up and reproduces the recorded signal from the disc 22 according to the variation in the light intensity of the laser beam reflected from or transmitted through the disc 22. The signal which is picked up and reproduced by the pickup device 27, is supplied to a frequency demodulating circuit 29 through a pickup circuit 28. A demodulated signal from the demodulating circuit 29, is supplied to a memory circuit 30. The subject matter of the present invention relates to how the demodulated signal is written into the memory circuit 30. The digital video signal and the like is written into and read out from the memory circuit 30, under the control of a read/write controller 31. In a case where a digital audio signal is included in the digital signal which is supplied to the memory circuit 30, the digital audio signal is also written into and read out from the memory circuit 30. However, description with respect to the write-in and read-out of the digital audio signal will be omitted in the present specification, because the write-in and read-out of the digital audio signal is not directly related to the subject matter of the present invention.

Luminance picture element data which are read out from the memory circuit 30 as will be described later on in the specification, and two kinds of color difference picture element data which are similarly read out from respective memory element groups (not shown) at a sampling frequency of 2.25 MHz, are respectively and simultaneously supplied to a digital-to-analog (DA) converter 32. The DA converter 32 obtains the luminance signal Y and the color difference signals (R−Y) and (B−Y), and supplies these signals to an encoder 33. The encoder 33 forms a color video signal which is in conformance with a predetermined standard television system, from the output signals of the DA converter 32 and the horizontal synchronizing signal, the vertical synchronizing signal, the color burst signal, and the like which are produced independently in a signal generator 34. The color video signal from the encoder 33, is produced through an output terminal 35. Accordingly, as will be described later on in the specification, it is possible to obtain a reproduced picture in which the picture element data are arranged as shown in FIGS. 9A and 9B.

Figure 5:
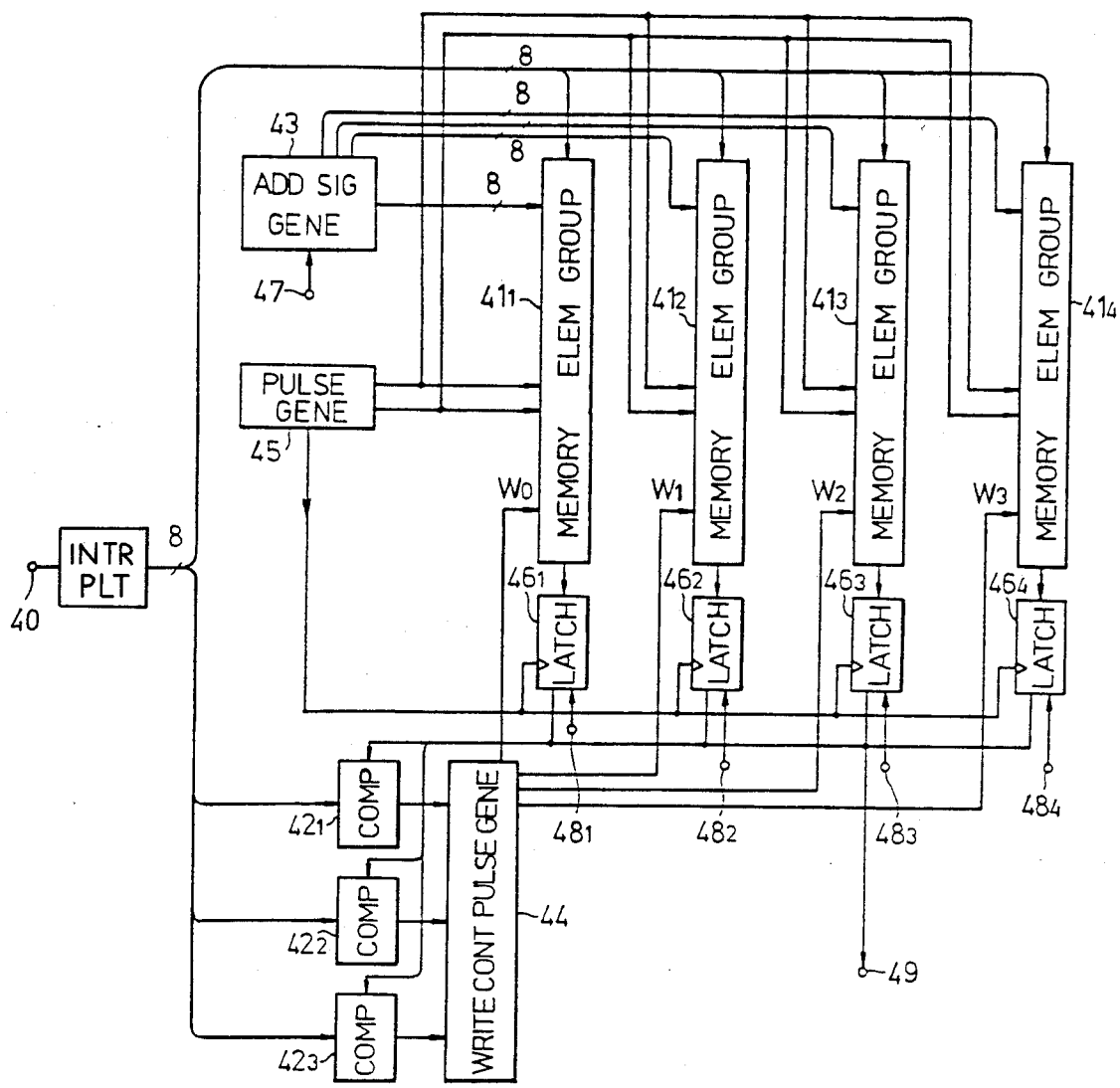
FIG. 5 is a systematic block diagram showing an embodiment of an essential part of the block system shown in FIG. 4.

Next, description will be given with respect to the construction and operation of the memory circuit 30 and the read/write controller 31, by referring to FIG. 5. FIG. 5 shows a memory circuit part for storing the picture element data of the digital luminance signal, and the read/write controller 31. Actually, two columns of memory element groups, latch circuits, and the like are provided with respect to the picture element data of the two kinds of digital color difference signals. However, the operation of the circuit part provided with respect to the two kinds of digital color difference signals is the same as the circuit part provided with respect to the digital luminance signal, and thus, the illustration and description of the circuit part provided with respect to the two kinds of digital color difference signals will be omitted. In FIG. 5, a reproduced digital video signal having a quantization number of 8 bits for one picture element, is applied to an input terminal 40. This reproduced digital video signal is applied in parallel to four columns of memory element groups $41_1$ through $41_4$. The reproduced digital video signal is also simultaneously applied to comparators $42_1$, $42_2$, and $42_3$.

Four luminance picture element data within the same unit in the reproduced digital video signal which is made up of six kinds of picture element data which are transmitted in terms of this unit, are stored in the memory element groups $41_1$ through $41_4$. In other words, the four luminance picture element data are independently stored in the respective memory element groups $41_1$ through $41_4$. Each memory element group is constituted by a number of 64 k random access memories (RAMs) equal to the quantization number of bits with which the reproduction is to be carried out. In the present embodiment, the quantization number is 8 or less bits, and each memory element group is therefore constituted by 8 or less 64k RAMs.

Accordingly, the picture element data of the first field are written into the memory element group $41_1$ for every four picture element data, as shown in FIG. 2A. The picture element data of the second field are written into the memory element group $41_2$ for every four picture element data, as shown in FIG. 2B. Similarly, the picture element data of the first field are written into the memory element group $41_3$ for every four picture element data, as shown in FIG. 2C. Further, the picture element data of the second field are written into the memory element group $41_4$ for every four picture element data, as shown in FIG. 2D. As will be described later on in the specification, the above write-in operation is carried out with respect to one memory element group when a picture element data being reproduced from the disc 22, is the same as the picture element data which was reproduced from the disc 22 four fields before and was stored in the one memory element group. In a case where the picture element data being reproduced from the disc 22, is not the same as the picture element data which was reproduced from the disc 22 four fields before and was stored in the one memory element group, a different write-in operation is carried out as will be described later on in the specification.

The plurality of 64k RAMs which constitute each of the memory element groups $41_1$ through $41_4$, are respectively applied with a pulse signal RAS (row address strobe) shown in FIG. 6(A), a pulse signal CAS (column address strobe) shown in FIG. 6(B), an 8-bit address signal shown in FIG. 6(C) from an address signal generating circuit 43, a write enable pulse signal shown in FIG. 6(D) from a write-in control pulse generating circuit 44, and one bit of the input picture element data shown in FIG. 6(F) from the input terminal 40. The address signal representing the lower 8 bits of a 16-bit address is obtained as indicated by C1 in FIG. 6(C) when the level of the pulse signal RAS falls as shown in FIG. 6(A). On the other hand, the address signal representing the upper 8 bits of the 16-bit address is obtained as indicated by C2 in FIG. 6(C) when the level of the pulse signal CAS falls as shown in FIG. 6(B). The level of the write enable pulse signal rises as shown in FIG. 6(D) after a predetermined time elapses from a time when the level of the pulse signal CAS rises as shown in FIG. 6(B), so that the input picture element data is written at the address which is designated by the address signals C1 and C2. At the same time, the picture element data which has been stored at the same address up to that point in time, is read out as shown in FIG. 6(E), and the read-out is completed when the level of the pulse signal CAS rises. The pulse signals RAS and CAS are applied to the plurality of 64k RAMs in each of the memory element groups $41_1$ through $41_4$, from a pulse generating circuit 45.

Figure 6:
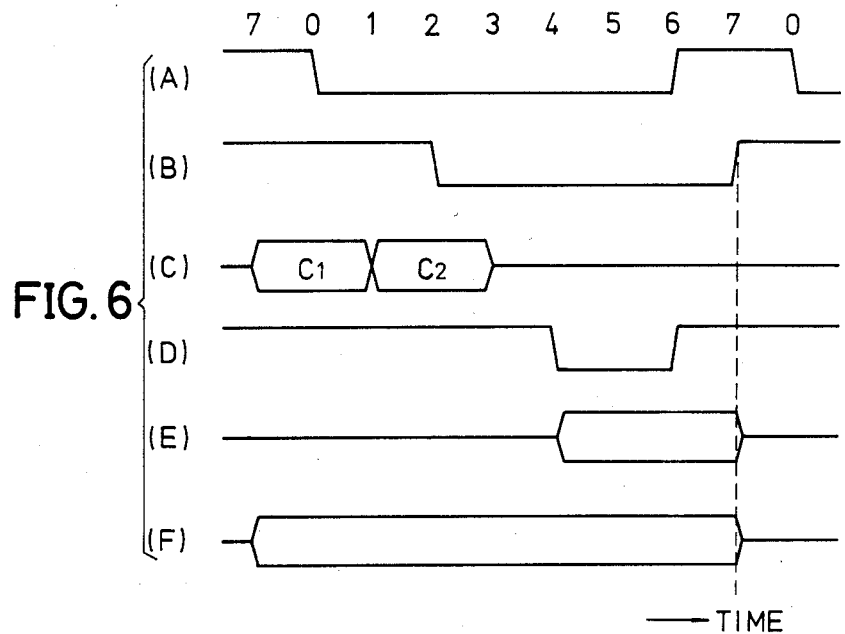
FIGS. 6(A) through 6(F) show signal waveforms for explaining the operation of the block system shown in FIG. 5.

Latch circuits $46_1$ through $46_4$ latch output data of the 64k RAMs by latch pulses from the pulse generating circuit 45, in phase with the leading edge of the pulse signal CAS shown in FIG. 6 (B). The numbers shown above the signal waveform in FIG. 6(A), illustrate the timing with which an 18 MHz timing clock pulse is generated. As may be seen from FIG. 6(A), the pulse signal RAS has a period of eight timing clock pulses. The address signal generating circuit 43 comprises a write-in address counter and a read-out address counter. The write-in address counter time-sequentially applies a 16-bit address signal which is incremented by one to each of the memory element groups $41_1$ through $41_4$ during the write-in operation, by dividing the 16-bit address signal into the upper and lower 8 bits. On the other hand, the read-out address counter comprises a first address counter and a second address counter. The first address counter time-sequentially generates a 16-bit address signal which is incremented by one from a hexadecimal value "0000" at a frequency of 2.25 MHz, by dividing the 16-bit address signal into the upper and lower 8 bits. The second address counter time-sequentially generates a 16-bit address signal which is incremented by one from a value which is greater than the initial output hexadecimal value "0000" of the first address counter by a value which is equal to the total number of picture elements in one scanning line, by dividing the 16-bit address signal into the upper and lower 8 bits. During the read-out operation, the output address signal of the address signal generating circuit 43 is switched between the output address signals of the first and second address counters, every time a vertical synchronizing pulse is applied to an input terminal 47.

Description will now be given with respect to the write-in operation. As described before, the picture element data which are arranged in the checkered pattern in the picture, are successively applied to the input terminal 40. With respect to the luminance picture element data for the case shown in FIGS. 2A through 2D, for example, the picture element data related to the odd numbered positions in the first field and the picture element data related to the even numbered positions in the second field which amount to one field, are successively applied to the input terminal 40 in a sequence from FIG. 2A through 2D. In this case, when displaying a partially moving picture or a still picture, the digital video signal corresponding to one field is repeatedly transmitted and applied to the input terminal 40. The still picture may be displayed by first storing the picture element data corresponding to one field in a duration of four fields, stopping the incrementing in the address counter, and then stopping the generation of the write-in control pulse.

For example, the comparator $42_1$ compares the upper 2 bits of an 8-bit reproduced picture element data from the input terminal 40 and the upper 2 bits of an 8-bit stored data from one of the latch circuits $46_1$ through $46_4$. The comparator $42_2$ compares the upper 5 bits of the 8-bit reproduced picture element data from the input terminal 40 and the upper 5 bits of the 8-bit stored data from one of the latch circuits $46_1$ through $46_4$. Further, the comparator 42 compares the upper 7 bits of the 8-bit reproduced picture element data from the input terminal 40 and the upper 7 bits of the 8-bit stored data from one of the latch circuits $46_1$ through $46_4$. When the compared bits coincide in each of the comparators $46_1$ through $46_3$, it is assumed that the two picture element data which were compared are the same. Thus, the write-in control pulse generating circuit 44 generates and supplies a write-in control pulse (write enable pulse) to one of the memory element groups $41_1$ through $41_4$ into which the reproduced picture element data is to be written, so that this one picture element group performs a write-in operation. In a case where the compared bits coincide in only the comparator $42_1$, it is assumed that the two picture element data which were compared greatly differ from each other, and the write-in control pulse generating circuit 44 supplies a write-in control pulse to three of the memory element groups $41_1$ through $41_4$, for example. In addition, in a case where the compared bits coincide in the comparators $42_1$ and $42_2$, the write-in control pulse generating circuit 44 supplies a write-in control pulse to two of the memory element groups $41_1$ through $41_4$. The comparison of the least significant bits of the two picture element data is neglected in the comparator $42_3$, in order to prevent an erroneous comparison which is caused by noise.

As shown in FIGS. 2A through 2D, the luminance picture element data of the first field in the columns which are spaced apart by three columns and inclusive of the first column from the left of the picture, the luminance picture element data of the second field in the columns which are spaced apart by three columns and inclusive of the second column from the left of the picture, the luminance picture element data of the first field in the columns which are spaced apart by three columns and inclusive of the third column from the left of the picture, and the luminance picture element data of the second field in the columns which are spaced apart by three columns and inclusive of the fourth column from the left of the picture, are successively transmitted in terms of the duration of one field, so as to transmit the luminance picture element data corresponding to one frame in the duration of four fields. Hereinafter, one or all of the luminance picture element data of the first field in the columns which are spaced apart by three columns and inclusive of the first column from the left of the picture, will be denoted by $Y_0$. Similarly, one or all of the luminance picture element data of the second field in the columns which are spaced apart by three columns and inclusive of the second column from the left of the picture, one or all of the luminance picture element data of the first field in the columns which are spaced apart by three columns and inclusive of the third column from the left of the picture, and one or all of the luminance picture element data of the second field in the columns which are spaced apart by three columns and inclusive of the fourth column from the left of the picture, will respectively be denoted by $Y_1$, $Y_2$, and $Y_3$. Hence, in the case where the compared bits coincide in each of the comparators $42_1$ through $42_3$, a low-level write-in control pulse $W_0$ continues to be supplied to the memory element group $41_1$ from the write-in control pulse generating circuit 44 in a reproducing duration of one field in which the picture element data $Y_0$ is reproduced. In a subsequent reproducing duration of one field in which the picture element data $Y_1$ is reproduced, a low-level write-in control pulse $W_1$ continues to be supplied to the memory element group $41_2$. A low-level write-in control pulse $W_2$ continues to be supplied to the memory element group $41_3$ in still a subsequent reproducing duration of one field in which the picture element data $Y_2$ is reproduced. Further, in a subsequent reproducing duration of one field in which the picture element data $Y_3$ is reproduced, a low-level write-in control pulse $W_3$ continues to be supplied to the memory element group $41_4$.

Figure 7:
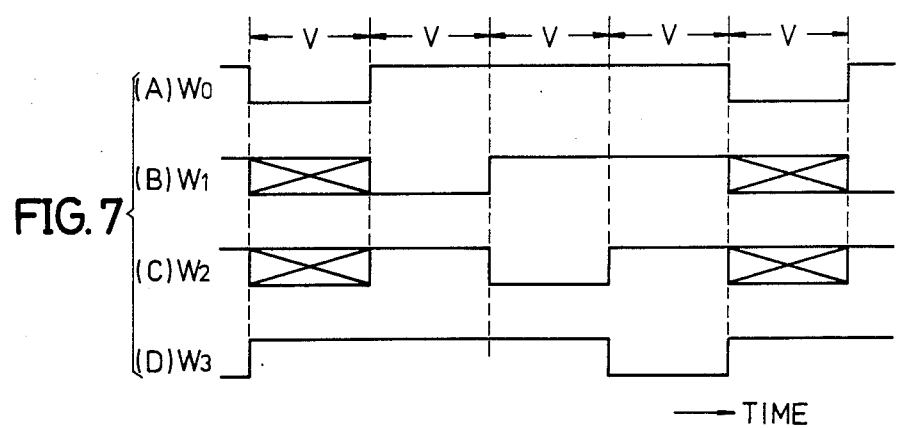
FIGS. 7(A) through 7(D) show signal waveforms for explaining the operation of the block system shown in FIG. 5.

When the compared bits coincide in the comparators $42_1$ and $42_2$ in the duration of one field in which the picture element data $Y_0$ is reproduced, for example, the low-level write-in control pulses $W_0$ and $W_1$ are supplied to the respective memory element groups $41_1$ and $41_2$ from the write-in control pulse generating circuit 44. However, when the reproduced picture element data $Y_0$ greatly differs from the picture element data $Y_0$ which is related to the same picture element position and was reproduced four fields before, the low-level write-in control pulses $W_0$ through $W_2$ are supplied to the respective memory element groups $41_1$ through $41_3$ from the write-in control pulse generating circuit 44. FIGS. 7(A), 7(B), 7(C), and 7(D) respectively show the timing charts of the write-in control pulses $W_0$, $W_1$, $W_2$, and $W_3$. In FIGS. 7(B) and 7(C), a part represented by a mark "⊠" indicates an uncertain part where the pulse may assume a high level or a low level depending on the difference between the reproduced picture element data $Y_0$ and the picture element data $Y_0$ which is related to the same picture element position and was reproduced four fields before.

FIGS. 8A, 8B, 8C, and 8D diagrammatically show the relationships between the memory element groups $41_1$ through $41_4$ and the write-in clock pulses. When there is a great difference between the reproduced picture element data $Y_0$ and the picture element data $Y_0$ which is related to the same picture element position and was reproduced four fields before in a duration of one field in which the reproduced picture element data $Y_0$ is written into the memory element group $41_1$, that is, when the compared bits coincide only in the comparator $42_1$, the write-in control pulses are respectively supplied to the memory element groups $41_1$ through $41_3$ as indicated by $W_A$ in FIG. 8A. On the other hand, when the above difference is small, the write-in control pulses are respectively supplied to the memory element groups $41_1$ and $41_2$ as indicated by $W_B$ in FIG. 8A. When the above difference is essentially zero, the write-in control pulse is only supplied to the memory element group $41_1$ as indicated by $W_C$ in FIG. 8A.

Similarly, in a duration of one field in which the picture element data $Y_1$ is reproduced, the write-in control pulses are supplied to the memory element groups $41_1$ through $41_4$ as shown in FIG. 8B. In other words, when the difference between the reproduced picture element data $Y_1$ and the picture element data $Y_1$ which is related to the same picture element position and was reproduced four fields before is essentially zero, the write-in control pulse is only supplied to the memory element group $41_2$ as indicated by $W_C$ in FIG. 8B. The write-in control pulses are respectively supplied to the memory element groups $41_2$ and $41_3$ as indicated by $W_B$ in FIG. 8B when the above difference is small. Further, the write-in control pulses are respectively supplied to the memory element groups $41_2$ through $41_4$ as indicated by $W_A$ in FIG. 8B when the above difference is great. In a duration of one field in which the picture element data $Y_2$ is reproduced, the write-in control pulses are respectively supplied to the memory element groups $41_3$ and $41_2$ or $41_1$ as shown in FIG. 8C, depending on the difference between the reproduced picture element data $Y_2$ and the picture element data $Y_2$ which is related to the same picture element position and was reproduced four fields before. In addition, in a duration of one field in which the picture element data $Y_3$ is reproduced, the write-in control pulses are respectively supplied to the memory element groups $41_4$, $41_1$, and $41_2$ as shown in FIG. 8D, depending on the difference between the reproduced picture element data $Y_3$ and the picture element data $Y_3$ which is related to the same picture element position and was reproduced four fields before. In FIGS. 8C and 8D, $W_a$ and $W_b$ represent write-in control pulses which are generated with respect to the picture element data which are to be written at addresses which are incremented by one compared to the respective addresses in which the picture element data were written in response to the write-in control pulses represented by $W_A$ and $W_B$.

Next, description will be given with respect to the write-in operation of the memory element groups $41_1$ through $41_4$ and the display of the reproduced picture element data. As described before, the reproduced picture element data $Y_0$, $Y_1$, $Y_2$, and $Y_3$ are written at predetermined addresses in the memory element groups $41_1$ through $41_4$, and at the same time, the picture element data $Y_0$, $Y_1$, $Y_2$, and $Y_3$ which were respectively reproduced four fields before and written at the same predetermined addresses are read out from the memory element groups $41_1$ through $41_4$ and latched in the respective latch circuits $46_1$ through $46_4$ responsive to the latch pulse of 2.25 MHz from the pulse generating circuit 45. As described before, this latch pulse is in phase with the leading edge of the pulse signal CAS shown in FIG. 6(B). Accordingly, the picture element data $Y_0$ through $Y_3$ which are latched in the latch circuits $46_1$ through $46_4$, are time-divisionally supplied to an output terminal 49 responsive to drive pulses applied to input terminals $48_1$ through $48_4$, and are also supplied to the comparators $42_1$ through $42_3$, within a certain duration until the subsequent latch pulse is supplied to the latch circuits $46_1$ through $46_4$. As a result, the read out picture element data (that is, the luminance picture element data) from the latch circuits $46_1$ through $46_4$ are successively and time-divisionally produced through the output terminal 49 during one period of the latch pulse which has the frequency of 2.25 MHz. In other words, the luminance picture element data is read out at a sampling frequency of 9 MHz with a quantization number of 8 bits.

In a duration in which the first field is reproduced, the stored picture element data are read out from the memory element groups $41_1$ through $41_4$ according to the address signal from the first address counter described previously. As a result, when the difference between the reproduced picture element data and the picture element data which is related to the same picture element position and was reproduced four fields before is essentially zero, the picture element data of the first field and the picture element data of the second field are alternately arranged and displayed in each of the scanning lines as shown in FIG. 9A. In addition, in a duration in which the second field is reproduced, the output address signal of the second address counter is applied to the memory element groups $41_1$ and $41_3$ and the output address signal of the first address counter is applied to the memory element groups $41_2$ and $41_4$ Accordingly, in the duration in which the second field is reproduced, the picture element data (indicated by [17] in FIG. 2A) in the second scanning line of the first field and positioned leftmost of the picture is read out from the memory element group $41_1$, and the picture element data (indicated by [19] in FIG. 2C) in the second scanning line of the first field and positioned third from the leftmost of the picture is read out from the memory element group $41_3$. On the other hand, the picture element data (indicated by [59] in FIG. 2B) in the first scanning line of the second field and positioned second from the leftmost of the picture is read out from the memory element group $41_{21}$, and the picture element data (indicated by [52] in FIG. 2D) in the first scanning line of the second field and positioned fourth from the leftmost of the picture is read out from the memory element group $41_4$.

Thereafter, the read-out operation is performed in a sequence similar to the sequence described above, in a duration in which the second field is reproduced. In this case, the picture element data are arranged and displayed as shown in FIG. 9B. Accordingly, when the difference between the reproduced picture element data and the picture element data which is related to the same picture element position and was reproduced four fields before is essentially zero, the picture element data of the first field and the picture element data of the second field are alternately arranged and displayed in a given scanning line in the duration in which the first field is reproduced and in the duration in which the second field is reproduced. Moreover, the combinations of the picture element data which are arranged and displayed in the given scanning line, are different between the durations in which the first and second fields are reproduced. Therefore, the apparent vertical resolution of the picture can be prevented from becoming deteriorated. In addition, because there is a strong correlation between the picture element data in the adjacent scanning lines, the folding distortion is distributed in the high frequencies. As a result, it is possible to visually reduce the noise which appears in the reproduced picture due to the folding distortion.

According to the present embodiment, the reproduced picture element data is compared with the stored picture element data so as to discriminate the speed of movement in the picture according to the difference between the reproduced picture element data and the stored picture element data, and a number of picture element data corresponding to the discriminated speed are replaced by the reproduced picture element data. Hence, by taking into account the correlation of data between frames, it is possible to obtain a reproduced picture within a duration of one field, and the deterioration of the picture can be kept to a minimum by use of the frame correlation.

Figure 10A:
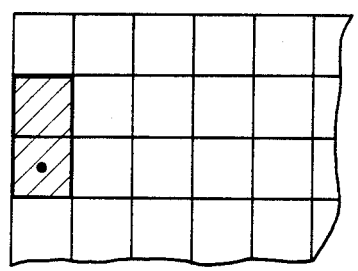
FIGS. 10A, 10B, and 10C show examples of picture element parts in which the same picture element data in the first column from the left of the picture are displayed.
Figure 10B:
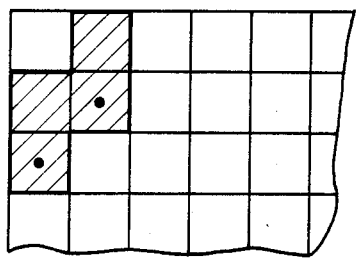
Figure 10C:
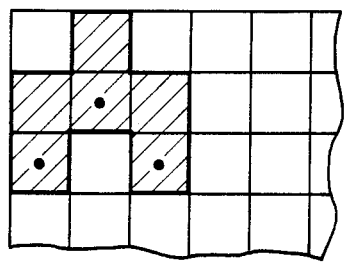

Next, description will be given with respect to the selective generation of the write-in control pulse and the display of the picture element data in the picture. For example, the picture element data $Y_0$ at a picture element position indicated by a black dot in FIG. 10A, that is, the picture element data at the position [17] shown in FIG. 2A, is displayed at two picture element positions indicated by hatchings in FIG. 10A when the difference between the reproduced picture element data $Y_0$ and the picture element data $Y_0$ reproduced four fields before is essentially zero, as may be understood from the description given in conjunction with FIGS. 9A and 9B. On the other hand, when the above difference is small, the picture element data at two picture element positions indicated by black dots in FIG. 10B are replaced by the same picture element data $Y_0$, and as a result, the same picture element data $Y_0$ is displayed at four picture element positions indicated by hatchings in FIG. 10B. Further, when the above difference is great, the picture element data at three picture element positions indicated by black dots in FIG. 10C are replaced by the same picture element data $Y_0$, and as a result, the same picture element data $Y_0$ is displayed at six picture element positions indicated by hatchings in FIG. 10C.

Figure 11A:
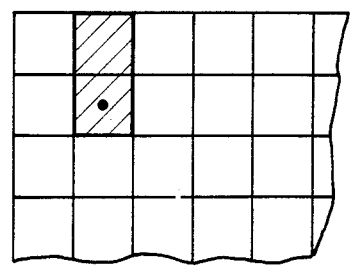
FIGS. 11A, 11B, and 11C show examples of picture element parts in which the same picture element data in the second column from the left of the picture are displayed.
Figure 11B:
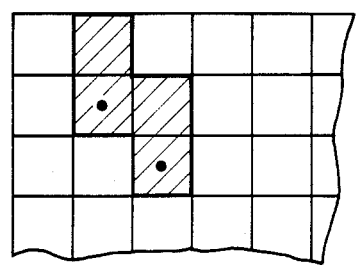
Figure 11C:
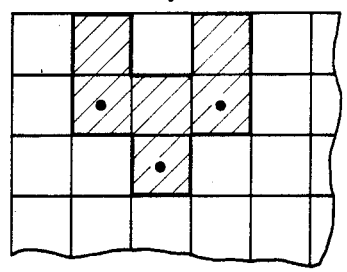
Figure 12A:
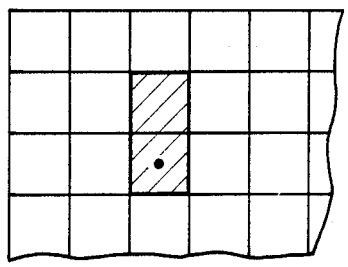
FIGS. 12A, 12B, and 12C show examples of picture element parts in which the same picture element data in the third column from the left of the picture are displayed.
Figure 13A:
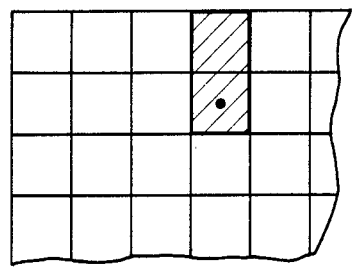
FIGS. 13A, 13B, and 13C show examples of picture element parts in which the same picture element data in the fourth column from the left of the picture are displayed.
Figure 12B:
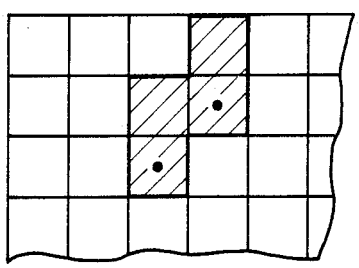
Figure 13B:
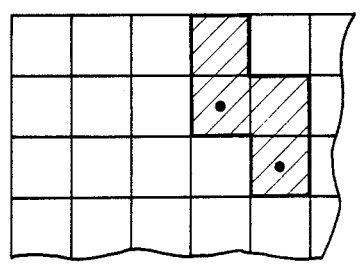
Figure 12C:
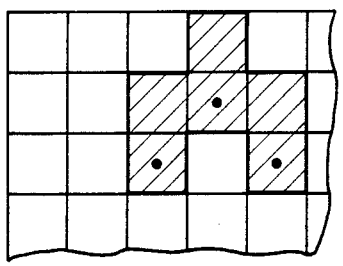
Figure 13C:
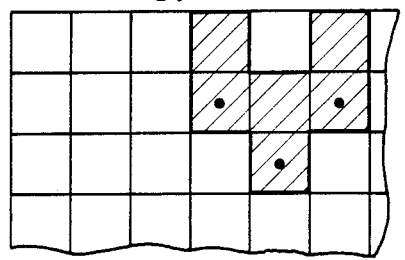

Similarly, the picture element data $Y_1$, $Y_2$, and $Y_3$ at picture element positions indicated by black dots in FIGS. 11A, 12A, and 13A, that is, the picture element data at the positions [50], [19], and [52] shown in FIGS. 2B, 2C, and 2D, are respectively displayed at positions indicated by hatchings in FIGS. 11A, 11B, and 11C, positions indicated by hatchings in FIGS. 12A, 12B, and 12C, and positions indicated by hatchings in FIGS. 13A, 13B, and 13C, depending on the respective differences between the reproduced picture element data $Y_1$, $Y_2$, and $Y_3$ and the picture element data $Y_1$, $Y_2$, and $Y_3$ which were reproduced four fields before the respective reproduced picture element data $Y_1$, $Y_2$, and $Y_3$. FIGS. 11A, 12A, and 13A show cases where the above differences are essentially zero. FIGS. 11B, 12B, and 13B show cases where the above differences are small. Further, FIGS. 11C, 12C, and 13C show cases where the above differences are great. In FIGS. 11 through 13, the black dots represent positions of the picture element data which have been replaced by the same picture element data.

In the embodiment described heretofore, it was described that the picture element data corresponding to one field and located at the positions indicated by the hatchings in FIG. 3, are reproduced and displayed as a picture of one frame by arranging the picture element data as shown in FIGS. 9A and 9B. However, the reproduction and display of the picture element data may be carried out with interpolation of known methods. For example, a method may be employed by which, four picture element data which are transmitted and are in the periphery of a picture element data (a picture element data which is not indicated by the hatchings in FIG.3) which is not transmitted, are appropriately weighted. According to this method, a data obtained by adding the weighted values, is used as the picture element data which is not transmitted. This method is effective when displaying a still picture. However, this method of using interpolation is not suited for the case where a moving picture is to be displayed, because an afterimage occurs. Thus, in case of a moving picture, it is preferable to employ another interpolation method by which four mutually adjacent picture element data (for example, the picture element data located at the positions indicated by [5], [9], [21], and [25] in FIG. 2A) among the reproduced picture element data of the same field are appropriately weighted. According to this other method, a data obtained from the weighted values, is displayed instead of the picture element data which is surrounded by the above four picture element data and is not transmitted.

As another method of transmitting the picture element data to be transmitted, it is possible to transmit the picture element data in the sequence shown in FIGS. 14A, 14B, 14C, and 14D for every one field. In this embodiment, ¼ of the picture element data corresponding to one field, is transmitted for every one field, as in the embodiment shown in FIGS. 2A, 2B, 2C, and 2D. However, this embodiment differs from the previously described embodiment in that the picture element data in different columns are transmitted in the odd and even scanning lines of both the first and second fields. According to this embodiment, the interpolation described before may be performed more effectively than in the embodiment shown in FIGS. 2A through 2D.

The present invention is not limited to the case where a recording medium is used as the transmission path, and the present invention may be applied to the transmission path of a wire telecommunication or a radio telecommunication. In addition, it is possible to transmit the digital video signal by coupling a television camera to the memory circuit 30. Moreover, after the digital video signal made up of the picture element data which correspond to one field and are arranged in the checkered pattern in the picture, is transmitted, a digital video signal made up of the picture element data which correspond to the remaining one field may be transmitted. In this case, it is possible to obtain a picture of a high quality when the reproducing apparatus comprises a frame memory. However, when the disc 22 is used as the recording medium in this case, it is desirable not to transmit the digital audio signal but to transmit the digital video signal by using all the channels. In the case of a video tape recorder, it is preferable to make the relative linear speed between the tape and head sufficiently higher than the relative linear speed employed in he existing video tape recorder.

Further, the present invention is not limited to these embodiments, but various variations and modifications may be made without departing from the scope of the present invention.

What is claimed is:

1. A digital video signal transmitting apparatus comprising:

picture element data forming means for obtaining picture element data by subjecting an analog video signal to a digital pulse modulation;

transmitting picture element data producing means for successively producing for every one field period, picture element data which are located at different picture element positions in a picture for each one field period and amount to ¼ the number of picture element data amounting to one field, among the picture element data which are successively obtained from said picture element data forming means in each one field period among first, second, third, and fourth field periods;

transmitting means for transmitting through a transmission path a digital video signal in which the transmitting picture element data from said transmitting picture element data producing means are time-sequentially multiplexed;

a memory circuit into which said digital video signal obtained through said transmission path is written;

comparator means supplied with each of the picture element data making up said digital video signal as an input picture element data and supplied with one of said reproduced picture element data located at the same picture element position as said input picture element data, for comparing values of said input picture element data and said one of said reproduced picture element data so as to detect a difference therebetween and for producing a detection signal indicative of said difference;

control circuit means for controlling a write-in to said memory circuit responsive to said detection signal from said comparator means, said control circuit means causing write-in of said input picture element data at the same write-in address in said memory circuit as said one of said reproduced picture element data when said detection signal indicates said difference to be essentially zero, and said control circuit means causing write-in of said input picture element data at the same write-in address as said one of said reproduced picture element data and at write-in addresses of the reproduced picture element data which are located in a vicinity of the picture element position of said input picture element data in the picture and amount to a number depending on said difference when said detection signal indicates said difference to be not essentially zero;

reproduced picture element data forming means for obtaining reproduced picture element data corresponding to one frame which are to be reproduced, by successively reading out the picture element data which amount to one field and were written into said memory circuit in said first through fourth field periods; and reproduced analog video signal forming means for forming a reproduced analog video signal from the reproduced picture element data obtained from said reproduced picture element data forming means.

2. A digital video signal transmitting apparatus as claimed in claim 1 in which said comparator means compares the values of said input picture element data and said one of said reproduced picture element data, by neglecting least significant bits of the values which are compared.

3. A digital video signal transmitting apparatus as claimed in claim 1 in which, when said difference is essentially zero, said reproduced picture element data forming means causes the same picture element data to be read out from said memory circuit a plurality of times, among the picture element data which amount to one field and were written in said memory circuit in said first through fourth field periods, so that four picture element data located at four mutually adjacent picture element positions in one scanning line are made up of the picture element data which were written in said memory circuit in each of said first through fourth field periods.

4. A digital video signal transmitting apparatus as claimed in claim 1 in which said reproduced picture element data forming means comprises interpolating means for forming each of remaining non-transmitted picture element data which amount to one field and are not transmitted, other than the picture element data which amount to one field and were written in said memory circuit in said first through fourth field periods, from four picture element data which are read out from said memory circuit and are located at picture element positions in a periphery of a picture element position of each of said non-transmitted picture element data.

5. A digital video signal transmitting apparatus as claimed in claim 4 in which said four picture element data relate to different fields, and said digital video relates to a still picture.

6. A digital video signal transmitting apparatus as claimed in claim 4 in which said four picture element data relate to the same field, and said digital video signal relates to a moving picture.

* * * * *